United States Patent Office 3,202,645
Patented Aug. 24, 1965

3,202,645
SURFACE TREATED INORGANIC SOLID POLYMERIZATION CATALYST AND METHOD OF POLYMERIZATION THEREWITH
Joel A. Yancey, Wellesley, Mass., assignor to Cabot Corporation, Boston, Mass., a corporation of Delaware
No Drawing. Filed Dec. 16, 1964, Ser. No. 418,919
32 Claims. (Cl. 260—93.7)

This invention relates to the polymerization and copolymerization of α-mono- and di-olefins such as ethylene, propylene, butene-1, styrene, isoprene and butadiene, and includes within its scope novel catalysts for such polymerization reactions.

This application is a continuation in part of U.S. Serial No. 81,948, filed January 11, 1961, now abandoned; U.S. Serial No. 218,117, filed August 20, 1962, now abandoned; and U.S. Serial No. 227,567, filed October 1, 1962, now abandoned, all by Joel A. Yancey.

It is a principal object of the present invention to provide novel catalysts for polymerizing α-mono- and di-olefins, and mixtures thereof.

Another object of the present invention is to provide a novel process for polymerizing α-mono- and di-olefins and mixtures thereof.

Other objects of the present invention will in part be obvious and will in part appear hereinafter.

In accordance with the present invention, α-mono- and di-olefins, preferably those containing not over 8 carbon atoms, are polymerized or copolymerized by catalysts comprising (a) the product of the reaction between a compound of a metal chosen from the group consisting of the metals of Groups IIb and IIIb (where the group numbers correspond to the Mendeleev Periodic Table) and hydroxyl groups on the surface of a finely-divided particulate inorganic solid, preferably finely-divided silica or alumina, and (b) a halide-type compound of a Group IVa, V, VIa, VIIa, or period 4 of Group VIII metal. The polymerization or copolymerization reaction can be effected at suitable temperatures within the range of from about −25° C. to about 250° C., and pressures ranging from below atmospheric upwardly to any desired maximum pressure, for example, 30,000 p.s.i.g. or even higher pressures.

The inorganic solids preferred for the purposes of the present invention are pyrogenic silica and alumina, that is alumina or silica produced by the vapor phase oxidation and/or hydrolysis of an aluminum or silicon compound. However, other inorganic solids suitable for the purpose of the present invention generally include any inorganic substance which is available in finely-divided particulate form with hydroxyl groups on the surface thereof. For example, oxides such as titania, zirconia, thoria and magnesia, silicates such as chrysotile, actinolite and cricidolite and aluminates such as corundum and bauxite are all generally suitable for the purposes of the present invention.

Compounds of metals of Groups IIb and IIIb (hereinafter referred to as "organometallic compounds") suitable for the purposes of the present invention are any of the compounds conforming to the empirical formula:

$$MM'_vX_nR_y$$

wherein M is chosen from the metals of Groups IIb and IIIb; M' is a metal of Group I; $v$ is a number from 0 to 1; each X is any halogen; $n$ is a number from 0 to 2; each R is any monovalent hydrocarbon or hydride radical; and $y$ is a number from 2 to 4.

Specific examples of R groups for substitution in the above formula include methyl, isobutyl, hexyl, n-dodecyl, 2-methyl-2-butenyl, cyclohexylethyl, methylcyclopentylethyl, 4-cyclohexenylethyl, 2-phenylethyl, methylnaphthylethyl, 2,2,1-bicycloheptyl, dimethylcyclopentyl, dimethylcyclohexyl, iso-propylcyclohexyl, 5-cyclopentadienyl, phenylcyclopentyl, phenyl, tolyl, ethylphenyl, dimethylnaphthyl, cyclohexylphenyl and the like.

Specific examples of compounds conforming to the above formula and which are therefore suitable for the purposes of the present invention are dimethyl zinc—$(CH_3)_2Zn$; diethyl zinc—$(C_2H_5)_2Zn$; ethyl n-propyl zinc—$C_2H_5Zn$-n-$C_3H_7$; di-n-propyl zinc—$(n$-$C_3H_7)_2Zn$; di-iso-propyl zinc—$(i$-$C_3H_7)_2Zn$; ethyl isobutyl zinc—$C_2H_5Zn$-i-$C_4H_9$; n-propyl isobutyl zinc—$n$-$C_3H_7Zn$-i-$C_4H_9$; di-n-butyl zinc — $(n$-$C_4H_9)_2Zn$; di-isobutyl zinc — $(i$-$C_4H_9)_2Zn$; isobutyl-isoamyl zinc—i-$C_4H_9Zn$-i-$C_5H_{11}$; di-isoamyl zinc — $(i$-$C_5H_{11})_2Zn$; diphenyl zinc — $(C_6H_5)_2Zn$; di-o-tolyl zinc—$(o$-$CH_3C_6H_4)_2Zn$; di-β-naphthyl zinc—$(β$-$C_{10}H_7)_2Zn$; dimethyl cadmium—$(CH_3)_2Cd$; diethyl cadmium—$(C_2H_5)_2Cd$; di-n-propyl cadmium—$(n$-$C_3H_7)_2Cd$; di-n-butyl cadmium—$(n$-$C_4H_9)_2Cd$; di-isobutyl cadmium—$(i$-$C_4H_9)_2Cd$; di-isoamyl cadmium—$(i$-$C_5H_{11})_2Cd$; diphenyl cadmium—$(C_6H_5)_2Cd$; dimethyl mercury — $(CH_3)_2Hg$; di-o-biphenylyl mercury — $(o$-$C_6H_5C_6H_4)_2Hg$; di-isopropyl mercury—$(i$-$C_3H_7)_2Hg$; methyl phenyl mercury—$CH_3HgC_6H_5$; di-n-butyl mercury—$(n$-$C_4H_9)_2Hg$; di-t-butyl mercury—$(t$-$C_4H_9)_2Hg$; di-isoamyl mercury—$(i$-$C_5H_{11})_2Hg$; dicyclohexyl mercury—$(C_6H_{11})_2Hg$; di-m-tolyl mercury—

$$(m\text{-}CH_3C_6H_4)_2Hg$$

diheptyl mercury—$(C_7H_{15})_2Hg$; diphenylethyl mercury—$(C_6H_5CH_2CH_2)_2Hg$; di-o-xylyl mercury—

$$[o\text{-}(CH_3)_2C_6H_3]_2Hg$$

di-p-xylyl mercury—$[p\text{-}(CH_3)_2C_6H_3]_2Hg$; di-β-ethylhexyl mercury—

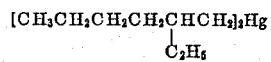

2,4,5-dimesityl mercury—$[2,4,5\text{-}(CH_3)_3C_6H_2]_2Hg$; dipropylphenyl mercury—$[(C_3H_7)_2C_6H_3]_2Hg$; di-α-naphthyl mercury—$(α\text{-}C_{10}H_7)_2Hg$; tri-i-butylborine—

$$(i\text{-}C_4H_9)_3B$$

dimethyl iodoborine—$(CH_3)_2BI$; tetraborane—$B_4H_{10}$; tetramethyl diborane—$H(CH_3)_2BB(CH_3)_2H$; tri-i-amyl borine—$B(i\text{-}C_5H_{11})_3$; 1,1,2-trimethyl diborane—

$$H(CH_3)_2BB(CH_3)H_2$$

tri-n-propylborine—$(n\text{-}C_3H_7)_3B$; trihexylborine—

$$(C_6H_{13})_3B$$

monoiododiborane—$H_3BBH_2I$; trimethylgalline—

$$Ga(CH_3)_3$$

tetramethyl digalline — $(CH_3)_2GaGa(CH_3)_2$; triethylgalline—$Ga(C_2H_5)_3$; dimethylchlorogalline—

$$(CH_3)_2GaCl$$

dimethyl tetrahydroborino galline—$(CH_3)_2GaBH_4$; digallane—$H_3GaGaH_3$; trimethyl indine—$In(CH_3)_3$; tripropyl indine — $In(C_3H_7)_3$; dibenzylbromothalane — $(C_6H_5CH_2)_2TlBr$; trimethyl thallane—$(CH_3)_3Tl$; tri-i-butyl thallane—$(C_4H_9)_3Tl$; lithium tetraethylaluminum—$(C_2H_5)_4LiAl$; lithium tetrahexylaluminum—

$$(C_6H_{11})_4LiAl$$

potassium trioctylaluminum fluoride — $(C_8H_{17})_3KalF$; lithium triethylaluminum bromide—$(C_2H_5)_3LiAlBr$; diisobutylaluminum chloride—$(i\text{-}C_4H_9)_2AlCl$; and diisobutylaluminum hydride—$(i\text{-}C_4H_9)_2AlH$; and in particular the pure aluminum alkyls, such as trihexylaluminum—

$(C_6H_{13})_3Al$; triethylaluminum—$(C_2H_5)_3Al$; trimethylaluminum—$(CH_3)_3Al$; and triisobutylaluminum—

$$(i-C_4H_9)_3Al$$

Although it is appreciated that when all of the R's present in the above-defined empirical formula are hydride radicals, the resulting compound is not normally termed an organometallic compound, compounds lacking at least one hydrocarbon radical comprise such a relatively small number of the total number of compounds included by said formula that for the purposes of the present invention, it is most convenient and not illogical that these compounds be included within the generic term, "organometallic compound." Accordingly, in the specification and in the claims, it is intended, and therefore it should be understood, that the term, "organometallic compound," refers to all the compounds included within the scope of the above-defined empirical formula.

The conditions under which reaction between the organometallic compound and the finely-divided solid can be accomplished are subject to considerable variation. However, in order to obtain a catalyst component with exceptionally high activity and reproducible character and performance, it has been found to be all important that the finely-divided solid be essentially dry and anhydrous (i.e. free of molecular water in any form) at the time it is brought into contact with the organometallic compound. If the finely-divided solid to be utilized contains molecular water in any form and/or tends to absorb same on exposure to humid atmospheres, etc., it must be dried immediately before use, or, after drying must be maintained continuously out of contact with water vapor until utilized. If the precaution of using a substantially anhydrous finely-divided solid is not observed, the desired chemical reaction either does not occur at all or does not predominate to the extent necessary to produce a superior catalyst component. Instead, products are obtained which are either totally inactive as catalyst components or are very inferior as catalyst components, in that (a) less polymer per gram of catalyst is produced and (b) reaction rates for production of polymer are lower.

Generally, the reaction can be carried out by contacting the finely-divided solid with an organometallic compound, preferably a solution thereof in an inert hydrocarbon medium, and maintaining the two reactants in intimate contact for a period of time sufficient to effect the desired chemical reaction resulting in the chemical bonding of the organometallic compound to the finely-divided solid. The length of time required to effect a given amount of such reaction and chemical bonding is largely dependent upon the temperature of the reaction mixture.

Generally speaking, any temperature between about 0° C. and 100° C. can be used satisfactorily, but room temperature or higher will generally be used. Assuming provision is made for intimate contact of the dry, finely-divided solid and the organometallic compound, the time required to accomplish the chemical reaction needed will vary from periods of the order of one minute at temperatures of about 100° C. or higher, to periods of the order of 20 minutes at temperatures of about 10–20° C. Temperatures substantially higher than about 100° C., e.g. 150–175° C., often cause the decomposition of the organometallic compound and, moreover, are normally completely needless; hence, are of little or no interest.

Although use of the organometallic compound in solution form gives excellent results, reaction of the organometallic compound with the finely-divided solid can also be effected if the latter is exposed to sufficient quantities of the vapors of an organometallic compound under conditions of time and temperature similar to those discussed above. Said vapors can be supplied under their own vapor pressures using a partial vacuum if necessary, or with the aid of a dry, inert carrier gas such as nitrogen. This vapor phase treatment can be accomplished in any suitable manner such as by circulating the vapors through the particulate solid in a fixed, moving fluidized bed reactor.

The accomplishment of an actual chemical reaction of controlled extent between the finely-divided solid and the organometallic compound is of utmost importance in obtaining the exceptionally active and efficient catalyst components described in this invention, e.g. the grams of polymer producible per gram of catalyst employed is generally highly dependent upon the amount of organometallic compound chemically combined with a given weight of finely-divided solid. Accordingly, in preparing the surface-reacted, finely-divided solids of the present invention, it should be kept in mind that the smaller the average particle size of the solid and the larger the quantity of hydroxyl groups on the surface thereof, the greater will be the potential activity and efficiency of the resulting catalyst component producible therefrom. Therefore, it is important to use as the starting material, particulate finely-divided solids having an average particle diameter of less than about 1 micron, and preferably less than about 0.1 micron, and a substantial hydroxyl group content on the surface thereof. Accordingly, pyrogenic metal or metalloid oxides produced by the vapor phase oxidation or hydrolysis of a corresponding metal or metalloid compound are greatly preferred because they are available in average particle diameters of less than about 0.1 micron and have at least about 50% of the maximum number of hydroxyl groups theoretically possible on the surface thereof.

In short, to reduce this discussion of extent of reaction between the finely-divided solids and the organometallic compounds to the simplest possible terms, it is believed that the surface-reacted solid can best be described and specified as follows: Preferred for imparting optimum catalytic activity and providing maximum catalyst efficiencies when used with a given transition metal halide in a given system are those finely-divided solids which have at least about $1 \times 10^{-4}$ gram atoms of a metal of Group IIb or IIIb chemically linked to the surface thereof per gram of said solid. Still quite useful and practical, however, particularly when amounts of 1 part or more by weight of the solid per 100 parts of polymer are desired in the final polymerization product, are those surface-reacted solids which contain as little as $1 \times 10^{-5}$ gram atoms of a metal of Groups IIb or IIIb chemically combined to the surface thereof per gram of said soid. Although the mechanism of the reaction between the organometallic compound and the solid is not completely understood, it is known that the organometallic compound reacts with the hydroxyl groups on the surface of the solid liberating by-products such as the corresponding alkane when an alkyl radical reacts, or hydrogen when a hydride radical reacts. It is believed that the type of reaction that occurs is correctly illustrated by the following illustrative equations, wherein silica serves as the finely-divided solid and triethyl galline, lithium tetraethylaluminum, diethyl zinc, diethyl chlorogalline and lithium gallium hydride serve as the organometallic compounds:

EQUATION 1

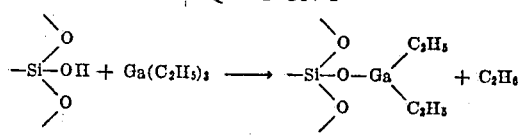

EQUATION 2

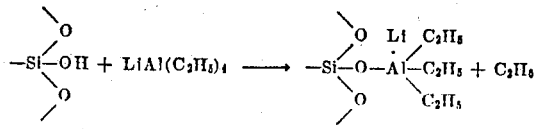

EQUATION 3

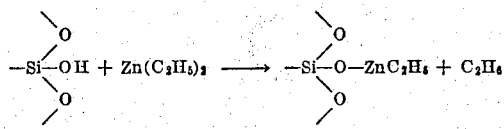

EQUATION 4

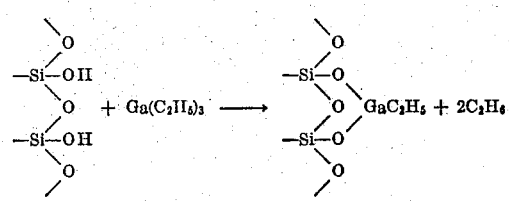

EQUATION 4a

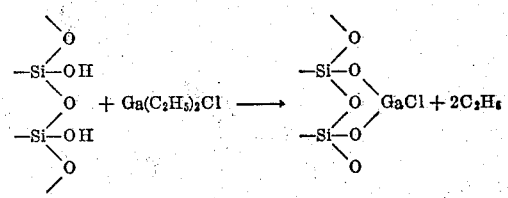

EQUATION 5

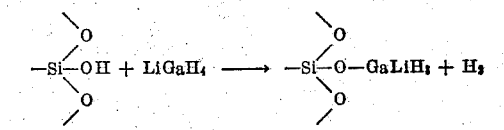

It is pointed out that in order to obtain a catalyst component of the highest possible activity, aside from observing the aforementioned important precautions and reaction conditions, it is also recommended that the quantity of organometallic compound with which the finely-divided solid is contacted be at least approximately sufficient to react with all the active hydroxyl groups present, since those left unreacted might deactivate a portion of the transition metal halide component of the catalyst which will be added subsequently. In addition, it is necessary that sufficient organo Group IIb or IIIb metal be attached to the surface of the solid to react or complex with the transition metal compound to be added subsequently, and to sustain the polymerization reaction. Accordingly, as the above equations tend to illustrate, it is generally necessary to provide at least one molecule of a trialkyl organometallic compound for every two hydroxyl groups, or one molecule of a dialkyl organometallic compound for each hydroxyl group, on the surface of the solid.

Moreover, it is generally desirable to use more than these minimum amounts of the organometallic compounds and to restrict the reaction temperatures to less than about 100° C. in order to favor the reactions typified by Equations 1, 2, 3 and 5 over those illustrated by Equations 4 and 4a respectively, because the products of Equation 4 tend to be less active as catalyst components than those of Equations 1, 2, 3 and 5, while products of Equation 4a are normally totally inactive as catalyst components, in the polymerization of α-mono and di-olefins, as are those from Equation 6 below since no organo-metal is present on the surface of the resultant products.

EQUATION 6

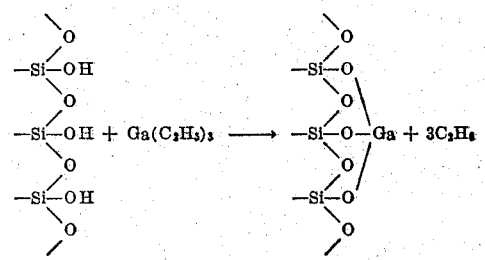

On the other hand, if more organometallic compound is introduced than will react under the reaction conditions used, the excess is preferably removed before formation of the complete polymerization catalyst. Although the excess can be removed by extraction, it is obviously more desirable to avoid additional steps.

It is pointed out that if organometallic dihalides or other compounds containing only one R group per molecule are utilized, active catalyst components cannot normally be produced because the alkyl radical preferentially reacts with the hydroxyl groups on the surface of the solid to produce a product typified by Equation 7 below:

EQUATION 7

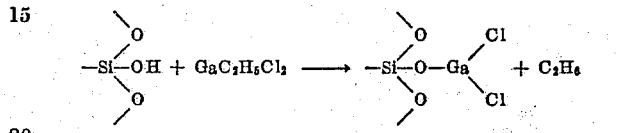

The halide-type compounds (hereinafter generally referred to as transition metal halides) which are suitable for use as the other component of the finished polymerization catalyst of the present invention are the compounds conforming to the empirical formula:

$$TO_aX_b$$

wherein T is a metal of Groups IVa, Va, VIa, VIIa or period 4 of Group VIII of the periodic table; O is oxygen; $a$ is a number from 0 to 2; each X is any halogen; and $b$ is a number from 1 to 7.

Examples of suitable compounds conforming to the empirical formula are halides of Group IVa, Va, VIa, VIIa and period 4 of Group VIII metals such as titanium tetrachloride, zirconium tetrachloride, titanium trichloride, vanadium tetrachloride, titanium tetraiodide, chromium trichloride, chromium tribromide, manganese dichloride, molybdenum hexachloride, ferric triiodide and cobaltous chloride and oxyhalides of said metals, such as vanadium oxychloride and chromic oxychloride.

Using the catalyst of this invention, polymerization of the olefinic charging stock can be accomplished in the absence of liquids, solvents or diluents, for example, in the gas phase, but it is usually easier to effect polymerization in the presence of a substantially inert liquid reaction medium. Accordingly, an inert liquid reaction medium is preferably supplied to the reaction zone.

Several classes of hydrocarbons or their mixtures which are liquid and substantially inert under the polymerization conditions of the present process constitute suitable liquid reaction media. Thus, various classes of saturated hydrocarbons such as pure alkanes or cycloalkanes or commercially available mixtures, freed of harmful impurities, are suitable for the purposes of the present invention. For example, straight run naphthas or kerosenes containing alkanes and cycloalkanes and liquid or liquefied alkanes such as propane, butanes, n-pentane, n-hexane, 2,3-dimethylbutane, n-octane isooctane (2,2,4-trimethylpentane), n-decane, n-dodecane, cyclohexane, methylcyclohexane, dimethylcyclopentane, ethylcyclohexane, decalin, methyldecalins, dimethyldecalins and the like are suitable. Also members of the aromatic hydrocarbon series, such as ethylbenzene, isopropylbenzene, 2-butylbenzene, t-butylbenzene, ethyltoluene, ethylxylenes, hemimellitene, pseudocumene, isodurene, diethylbenzenes, isoamylbenzene, and particularly the mononuclear aromatic hydrocarbons such as benzene, toluene, xylenes, mesitylene and xylene-p-cymene mixtures and the like are completely suitable. Aromatic hydrocarbon fractions obtained by the selective extraction of aromatic naphthas, from hydro-forming operations such as distillates or bottoms, from cycle stock fractions or cracking operations, etc., and certain alkyl naphthalenes which are liquid under the polymerization reaction conditions, for example, 1-methylnaphthalene, 2-isopropylnaphthalene, 1 - n - amylnaphthalene and the like, or commercially produced fractions containing these hydrocarbons and the like are also suitable. Satisfactory liquid reaction media can also be composed of mixtures of aromatic and paraffinic fractions which are individually suitable.

The proportion of surface-reacted finely-divided solid to transition metal halide utilized in preparing the finished catalyst is not usually a critical feature of the process. Moreover, if this proportion is expressed as a simple molar or weight ratio, it may not be particularly meaningful because as indicated above, the efficiency of said surface-reacted solids (on a weight or molar basis) is highly dependent upon the proportion of organo- Group IIb or IIIb metal chemically attached thereto. Accordingly, in order to be most meaningful the relationship between amounts of the two components of the finished catalyst should be expressed as some function of the amount of metal which is chemically attached to the surface of the finely-divided solid. We have found from experience that an atomic ratio of from 0.1 to 2 and preferably 0.3 to 1.4 of the transition metal to organo- Group IIb or IIIb metal chemically attached to the surface of the finely-divided solid is desirable.

The quantity of catalyst, i.e. comprising both the surface-reacted finely-divided solid and the transition metal halide to be utilized in the polymerization reaction may vary, the precise quantity selected for use being dependent upon the desired rate of polymerization, the geometry of the reaction zone, the composition of the particular olefinic charging stock, temperature and other reaction variables. It should be pointed out that in general the efficiency of the catalysts of the present invention is extremely high and accordingly, the total quantity of catalyst that need be employed based on the weight of the charging stock is very small particularly when (a) a very fine particle size metal or metalloid oxide (preferably pyrogenic) has been utilized as the finely-divided solid and (b) the organometallic compound finely-divided solid reaction has been conducted in such a manner as to leave more than one organo-radical attached to most of the metal atoms on the surface of the said solid.

Harmful impurities in the liquid hydrocarbon reaction medium can be effectively neutralized prior to the formation therein, or addition thereto, of the catalyst or catalyst components of this invention by treating the liquid medium with a metal alkyl or a transition metal compound. The olefinic charging stocks can also be purified by any known means such as bubbling said stocks through a solution of a metal alkyl in a hydrocarbon solvent prior to their introduction into the polymerization reactor.

Temperature control during the course of the polymerization process can be readily accomplished when a liquid hydrocarbon diluent is utilized because of the presence in the reaction zone of a large liquid mass having relatively high heat capacity. The liquid hydrocarbon reaction medium can, in turn, be cooled by indirect heat exchange with a suitable coolant inside or outside the reaction zone.

The contact time or space velocity employed in the polymerization process will be selected with reference to the other process variables such as the particular catalysts utilized, the specific type of product desired, and the extent of olefin conversion desired in any given run or pass over the catalyst. In general, this variable is readily adjustable to obtain the desired results.

There follow a number of illustrative, non-limiting examples:

*Example 1*

To a 2000 milliliter, three neck, glass reaction vessel equipped with a stirrer, a condenser and nitrogen inlet and outlet tubes, there is added 20 grams of "Cab-O-Sil," a pyrogenic silica produced by Cabot Corporation, which has an average particle diameter of 10 millimicrons and a hydroxyl group content on the surface thereof of about 1.5 milliequivalents per gram. To said reaction vessel there is added 1750 milliliters of benzene, and the resulting slurry is dried by being heated to and maintained at, the boiling point of benzene, i.e., about 80° C., for about 20 hours, while a water benzene azeotrope is removed from the reaction vessel by periodic distillation until about 550 milliliters of distillate has been removed. The preceding and following operations are all conducted in a nitrogen atmosphere. The vessel is then cooled and charged with 10 millimoles of digallane—$Ga_2H_6$. The resulting slurry is then heated to and maintained at about 60° C. for about 1 hour with continuous stirring. Subsequently, the extent of the reaction between the digallane and the hydroxyl groups in the surface of the silica is determined by measuring the quantity of hydrogen that was produced and by testing the liquid contents of the vessel for the absence therein of digallane and the said silica is found to have 20 milliatoms of gallium chemically bound to the surface thereof. A 60 milliliter sample containing about 1 milliatom of gallium chemically bound to the surface of about 1 gram of silica, is then transferred from this vessel to a 1000 milliliter, three neck, reaction vessel which has been previously flushed with dry nitrogen. Next, 0.5 millimole of titanium tetrachloride is added to the vessel and the contents of the vessel are then continuously and vigorously agitated and ethylene is continuously swept through said vessel at a rate somewhat faster than its consumption for about 4 hours. The reaction prdoucts are analyzed and it is found that 75 grams of polyethylene has been produced.

*Example 2*

To a 1000 milliliter, three neck, glass reaction vessel there is added 10 grams of "P–25," a pyrogenic titania produced by Deutsche Gold- und Silber-Scheideanstalt vormals Roessler, which has an average particle diameter of about 20 millimicrons and a hydroxyl group content on the surface thereof (as measured by ignition losses of the dry titania) of between about 1 and 1.4 milliequivalents per gram. Said reaction vessel is then placed in an oven heated to a temperature of about 110° C. for about 18 hours. Subsequently, the vessel is flushed with nitrogen, sealed with self-sealing rubber gaskets without exposing said titania to the atmosphere and there are charged to the vessel 700 milliliters of isooctane and 7.2 millimoles of tri-n-butyl borine. The vessel is then continuously stirred, while being maintained at a temperature of about 50° C. for a period of 1 hour. Subsequently, the extent of the reaction between the tri-n-butyl borine and the titania is determined by testing the liquid contents of the vessel. No tri-n-butyl borine is found in the liquid contents while analysis of the titania phase shows that 7.2 milligram atoms of boron are chemically bound to the surface of the titania. An aliquot containing about 1.0 gram of titania and 0.72 milligram atoms of boron is then transferred without exposure to the atmosphere from said vessel to a 500 milliliter, three neck, glass reaction vessel which has been previously flushed with dry nitrogen. Two hundred milliliters of isooctane are then charged to the vessel and the vessel is saturated with proylene. Next, 0.4 millimole of vanadium tetrachloride is added and the contents of said reaction vessel are continuously and vigorously stirred and propylene is continuously swept through said vessel at a rate somewhat faster than its consumption for about 3 hours. The reaction products are analyzed and it is found that solid polypropylene has been formed.

*Example 3*

To a 1000 milliliter, three neck, glass reaction vessel there is added 4 grams of "Alon," a pyrogenic alumina sold by Cabot Corporation, which has an average particle diameter of about 15 millimicrons and hydroxyl group content (based on ignition losses of dry material) on the surface thereof of between about 0.8 and 1.4 milliequivalent per gram. Said reaction vessel is then placed in a vacuum drying oven heated to a temperature of about 110° C. for about 12 hours. Subsequently, the vessel is sealed without exposing said alumina to the atmosphere, and there are charged to said vessel, 3.4 millimoles of tri-i-butyl thallane and 150 milliliters of benzene. The vessel is then continuously stirred, and maintained at a temperature of about 75° C. for a period of 45 minutes. Subsequently, the extent of the reaction between the tri-i-butyl thallane and alumina is determined by testing the contents of the vessel. No tri-i-butyl thallane is found in the liquid while analysis of said alumina shows that 3.4 milligram atoms of thallium are chemically bound to the surface thereof. An aliquot containing 2 grams of alumina and 1.7 milligram atoms of thallium chemically bound to the surface thereof is then transferred without exposure to the atmosphere from this reaction vessel to a 1000 milliliter, three neck, glass reaction vessel which has been previously flushed with dry nitrogen. 50 milliliters of benzene are then charged to this second vessel and the vessel is saturated with a mixture consisting of 20% ethylene and 80% propylene by weight. Next, 0.4 millimole of vanadium oxytrichloride is added and the contents of said reaction vessel are continuously and vigorously stirred, and a gaseous mixture consisting of 20% ethylene and 80% propylene by weight is continuously swept through the reaction vessel at a rate somewhat faster than its consumption for about 4 hours. The reaction products are analyzed and it is found that a solid copolymer of ethylene and propylene has been produced.

*Example 4*

To a 1000 milliliter, three neck, glass reaction vessel there is added 10 grams of "P-25." Said reaction vessel is then placed in an oven heated to a temperature of about 110° C., for about 18 hours. Subsequently, the vessel is sealed with a self-sealing rubber gasket without exposing said titania to the atmosphere and the vessel is evacuated and filled with nitrogen. 700 milliliters of isooctane and 7.2 millimoles of triisobutylaluminum are charged to said vessel under a nitrogen atmosphere. The vessel is then continuously stirred, while being maintained at about room temperature for a period of 30 minutes. Subsequently, the extent of the reaction between the triisobutylaluminum and the titania is determined by testing the liquid contents of the vessel for aluminum alkyl. None is found in the liquid while analysis of the titania phase shows that 7.2 milligram atoms of alkylated aluminum are chemically bound to the surface of the titania. An aliquot containing about 1.0 gram of titania and 0.72 milligram atoms of alkylated aluminum chemically bonded to the surface thereof is then transferred without exposure to the atmosphere from said vessel to a 500 milliliter, three neck, glass reaction vessel which has been previously flushed with dry nitrogen. Two hundred milliliters of isooctane are then charged to the vessel and the vessel is saturated with ethylene. Next, 0.4 millimole of titanium tetrachloride is added and the contents of said reaction vessel are continuously and vigorously stirred and ethylene is continuously swept through said vessel at a rate somewhat faster than its consumption for about 3 hours. The reaction products are analyzed and it is found that 90 grams of polyethylene which has a density of about 0.96 has been produced. The polymer product is a powdery material and is found to have a crystalline melting point of about 130–135° C. It is further found that none of the ethylene has been converted to a normally liquid product.

*Example 5*

This example is a duplicate of Example 4, except that the titania is not dried prior to treatment with the triisobutylaluminum. After the 30 minute treatment with triisobutylaluminum is completed, an aliquot containing 1.0 gram of titania is transferred to a reaction vessel and a polymerization reaction as set forth in Example 4 is then conducted. The products from the polymerization reaction are analyzed and it is found that approximately 0.1 gram of polyethylene has been produced.

*Example 6*

To an 8 ounce bottle there is added 1.2 grams of "P-25." Said bottle is then placed in a vacuum drying oven heated to a temperature of about 110° C. for about 12 hours. Subsequently, the bottle is sealed with a self-sealing rubber gasket without exposing said titania to the atmosphere, evacuated and filled with nitrogen. 150 milliliters of isooctane and 0.9 millimole of diisobutylaluminum hydride are charged to said bottle under a nitrogen atmosphere. The bottle is then continuously shaken, while being maintained at about room temperature, for a period of about 45 minutes. Subsequently, the extent of the reaction between the triisobutylaluminum hydride and the titania is determined by testing the liquid contents of the bottle for aluminum alkyl. None is found in the liquid while the titania is found to have 0.9 milligram atoms of alkylated aluminum chemically bound to the surface thereof. An aliquot containing about 0.6 gram of titania, and about 0.45 milligram atoms of alkylated aluminum attached to the surface of said titania is then transferred without exposure to the atmosphere from the bottle to a 500 milliliter, three neck, glass bottle which has been previously flushed with dry nitrogen. 150 milliliters of isooctane are then charged to this bottle and the bottle is saturated with liquid butadiene. Next, 0.3 millimole of manganese dichloride, 90 grams of liquid butadiene and 15 grams of butene-1 are added and the contents of said second bottle are continuously and vigorously stirred at 0–10° C. for about 2 hours. The reaction products are analyzed and it is found that 24 grams of a copolymer of butadiene and butene-1 has been produced.

*Example 7*

To an 8 ounce bottle previously flushed with nitrogen there is added 10 grams of ferric oxide having a hydroxyl group content on the surface thereof of about 0.5 milliequivalent per gram. Said bottle is then placed in a vacuum drying oven heated to a temperature of about 110° C. for about 12 hours. Subsequently, the bottle is sealed without exposing said ferric oxide to the atmosphere, and there are charged to said vessel 150 milliliters of benzene and 3.0 millimoles of trimethylaluminum. The bottle is then continuously shaken, and maintained at about room temperature for a period of 50 minutes. Subsequently, the extent of the reaction between the trimethylaluminum and the ferric oxide is determined by testing the liquid contents of the bottle for aluminum alkyl. None is found in the liquid while said ferric oxide is found to have 3.0 milligram atoms of alkylated aluminum attached to the surface thereof. An aliquot containing about 2 grams of ferric oxide and about 0.6 milligram atoms of alkylated aluminum attached to the surface of said ferric oxide is then transferred without exposure to the atmosphere from this bottle to a 12 ounce "soda" bottle which has been previously flushed with dry nitrogen. 100 milliliters of anhydrous benzene and 120 grams of liquid styrene are then charged to said "soda" bottle. Next, 0.5 millimole of ferric tribromide is added and the contents of said bottle are maintained at about 10° C. and continuously rotated end-over-end for about 8 hours. The reaction products are analyzed and it is found that 75 grams of polystyrene has been produced.

*Example 8*

To an 8 ounce bottle previously flushed with nitrogen there is added 4 grams of zirconia having a hydroxyl content of about 1.7 milliequivalents per gram. Said bottle is then placed in a vacuum drying oven heated to a temperature of about 110° C. for about 12 hours. Subsequently, the bottle is sealed with a self-sealing rubber gasket without exposing said zirconia to the atmosphere, and there are charged to said bottle 200 milliliters of isooctane and 4.1 millimoles of triisobutylaluminum. The bottle is then continuously shaken, and maintained at about room temperature for a period of 30 minutes. Subsequently, the extent of the reaction between the triisobutylaluminum and the zirconia is determined by testing the liquid contents of the bottle for aluminum alkyl. None is found in the liquid while said zirconia is found to have 4.1 milligram atoms of alkylated aluminum attached to the surface thereof. An aliquot containing about 1 gram of zirconia and 1 milligram atom of alkylated aluminum attached to the surface thereof is then transferred without exposure to the atmosphere from this bottle to a 32 ounce "soda" bottle, which has been previously flushed with dry nitrogen, and which is then fitted with a self-sealing rubber cap. 200 milliliters of isooctane are then charged to this second bottle and the solvent is saturated with butene-1. Next, 0.4 millimole of vanadium trichloride and 90 grams of liquid butene-1 are added and said bottle is continuously rotated end-over-end for about 8 hours in a 0° C. bath. The reaction products are analyzed and it is found that 60 grams of polybutene have been produced.

*Example 9*

To a 2000 milliliter, three neck, glass reaction vessel equipped with a stirrer, a condenser and nitrogen inlet and outlet tubes, there is added 25 grams of "Cab-O-Sil." To said reaction vessel there is added 1700 milliliters of benzene, and the resulting slurry is dried by being heated to, and maintained at, the boiling point of benzene, i.e. about 80° C., for about 20 hours, while a water/benzene azeotrope is removed from the reaction vessel by periodic distillation until about 500 milliliters of distillate have been removed. The vessel is then cooled and the contents thereof are transferred while under dry nitrogen to a second 2000 milliliter vessel containing 37.5 millimoles of diethyl zinc. The resulting slurry is then refluxed for about one hour with continuous stirring. Subsequently, the extent of the reaction between the diethyl zinc and hydroxyl groups in the surface of the silica is determined by measuring the quantity of ethane that was produced and by testing the liquid contents of the vessel for the absence therein of diethyl zinc and the said silica is found to have 37.5 milliatoms of zinc chemically bound thereto. A sample of 50 milliliters of this slurry containing about 1.5 milliatoms of zinc bound to the surface of about 1 gram of silica, is then transferred from this reaction vessel to a 1000 milliliter, three neck, reaction vessel which has been previously flushed with dry nitrogen and which contains 300 milliliters of purified isooctane. Next 0.75 millimole of titanium tetrachloride is added to the vessel. The contents of the vessel are then continuously and vigorously agitated and ethylene is continuously swept through said vessel at a rate somewhat faster than its consumption for about 2.5 hours. The reaction products are analyzed and it is found that 200 grams of polyethylene have been produced. The polymer product is found to have a density of about 0.96, a crystalline melting point of about 130° C.–135° C. and is found to be a powdery material. It is further found that none of the ethylene has been converted to a normally liquid product.

When either said silica bearing zinc on the surface thereof or the titanium tetrachloride is utilized alone as the catalyst, no solid polymer is formed.

*Example 10*

This example is a duplicate of Example 9 except that the silica is not dried prior to treatment with the diethyl zinc. The products from the polymerization reaction are analyzed and it is found that less than one gram of polyethylene has been produced.

*Example 11*

To a 2000 milliliter, three neck, glass reaction vessel equipped with a stirrer, a condenser and nitrogen inlet and outlet tubes, there is added 16 grams of "Alon." To said reaction vessel there is added 1650 milliliters of benzene, and the resulting slurry is dried by being heated to, and maintained at, the boiling point of benzene, i.e. about 80° C. for about 20 hours, while a water/benzene azeotrope is removed from the reaction vessel by periodic distillation until about 450 milliliters of distillate has been removed. The vessel is then cooled and the contents thereof are transferred under dry nitrogen to a second 2000 milliliter vessel containing 11 millimoles of diphenyl cadmium. The resulting slurry is then refluxed for about 1 hour with continuous stirring. Subsequently, the extent of the reaction between the diphenyl cadmium and hydroxyl groups in the surface of the alumina is determined by testing the liquid contents of the vessel for the absence therein of diphenyl cadmium and the said alumina is found to have 11 milliatoms of cadmium chemically bound to the surface thereof. A sample of 60 milliliters of this slurry containing about 0.55 milliatom of cadmium bound to the surface of about 0.8 gram of alumina, is then transferred from this reaction vessel to a 500 milliliter, three neck, reaction vessel which has been previously flushed with dry nitrogen and which contains 150 milliliters of purified hexane. Next, 0.3 millimole of vanadium oxychloride is added to the vessel. The contents of the vessel are then continuously and vigorously agitated and propylene is continuously swept through said vessel at a rate somewhat faster than its consumption for about 4 hours. The reaction products are anaylized and it is found that solid propylene has been produced.

The polymers produced by the process of this invention can be subjected to such aftertreatment as may be desired to fit them for particular uses or to impart desired properties. Thus, the polymers can be extruded, mechanically milled, filmed or cast, or converted to sponges or latices. Also, antioxidants, stabilizers, fillers such as carbon black and silicas, extenders, plasticizers, pigments, insecticides, fungicides, etc., can be incorporated into the said polymers.

Also, the polymers produced by the process of the present invention, especially the polymers having high specific viscosities can be blended with the lower molecular weight polymers to impart stiffness or other desired properties thereto. The solid resinous products produced by the process of the present invention can likewise, be blended in any desired proportions with hydrocarbon oils, waxes, with high molecular weight polybutylenes, and with other organic materials.

The polymer produced by the present process can also be subjected to chemical modifying treatments, such as halogenation, halogenation followed by dehalogenation, sulfohalogenation by treatment with sulfuryl chloride or mixtures of chlorine and sulfur dioxide, sulfonation, and other reactions to which hydrocarbons may be subjected. The polymers produced by our invention can also be cross-linked to effect increases in softening temperature, etc.

Obviously many changes can be made in the above-described examples and procedure without departing from the scope of the invention. For example, transition metal compounds other than those mentioned above are also suitable for the purposes of the present invention.

Also, finely-divided solids other than those mentioned above, for example, metal and metalloid oxides that are pyrogenically coformed or coprecipitated or mixed with other compounds or with each other are suitable for the purposes of the present invention.

Also, although not specifically disclosed heretofore, it is obvious that finely-divided solids reacted with mixtures of individually suitable organo-metallic compounds, and mixtures of individually suitable transition metal compounds are both also suitable for the purposes of the present invention.

Accordingly, it is intended that the above disclosure be regarded as illustrative and as in no way limiting the scope of the invention.

What I claim is:

1. A catalyst which comprises
   (a) a finely-divided inorganic solid having an average particle diameter of less than about 0.1 micron and having chemically linked directly to oxygen atoms in the surface thereof at least about $1 \times 10^{-4}$ equivalents per gram of structures conforming to the formula:

$$MM'_v X_n R_y$$

wherein M is chosen from the group consisting of the metals of Groups IIb and IIIb (where the group numbers correspond to the Mendeleev Periodic Table); M' is a metal of Group I; $v$ is a number from 0 to 1; each X is any halogen; $n$ is a number from 0 to 2; each R is any monovalent hydrocarbon or hydride radical; and $y$ is a number from 1 to 3; and
   (b) a compound conforming to the general formula:

$$TO_a X_b$$

wherein T is a metal chosen from the group consisting of groups IVa, Va, VIa, VIIa and period of 4 of Group VIII; O is oxygen; $a$ is a number from 0 to 2; each X is any halogen; and $b$ is a number from 0 to 7.

2. The catalyst of claim 1 wherein in the formula:
   $$MM'_v X_n R_y$$
   M is a metal of Group IIb.

3. The catalyst of claim 1 wherein in the formula:
   $$MM'_v X_n R_y$$
   M is zinc and each R is an alkyl group.

4. The catalyst of claim 1 wherein in the formula:
   $$MM'_v X_n R_y$$
   M is cadmium and each R is an alkyl group.

5. The catalyst of claim 1 wherein in the formula:
   $$MM'_v X_n R_y$$
   M is a metal of Group IIIb.

6. The catalyst of claim 1 wherein in the formula:
   $$MM'_v X_n R_y$$
   M is boron, $n$ is 0 and each R is an alkyl group.

7. The catalyst of claim 1 wherein in the formula:
   $$MM'_v X_n R_y$$
   M is thallium, $n$ is 0 and each R is an alkyl group.

8. The catalyst of claim 1 wherein in the formula:
   $$MM'_v X_n R_y$$
   M is indium, $n$ is 0 and each R is an alkyl group.

9. The catalyst of claim 1 wherein in the formula:
   $$MM'_v X_n R_y$$
   M is gallium, $n$ is 0 and each R is an alkyl group.

10. The catalyst of claim 1 wherein in the formula:
    $$MM'_v X_n R_y$$
    M is aluminum.

11. The catalyst of claim 1 wherein in the formula:
    $$MM'_v X_n R_y$$
    M is aluminum, $n$ is 0 and each R is an alkyl group.

12. The catalyst of claim 1 wherein in the formula:
    $$MM'_v X_n R_y$$
    M is aluminum, $v$ is 0, $n$ is 0 and each R is an alkyl group.

13. The catalyst of claim 1 wherein in the formula:
    $$MM'_v X_n R_y$$
    $v$ is 0, $n$ is 0 and each R is an alkyl group.

14. The catalyst of claim 1 wherein in the formula:
    $$TO_a X_b$$
    each X is chlorine.

15. The catalyst of claim 1 wherein said compound conforming to the formula:
    $$TO_a X_b$$
    is a compound of a metal of Group IVa.

16. The catalyst of claim 1 wherein said compound conforming to the formula:
    $$TO_a X_b$$
    is a compound of titanium.

17. The catalyst of claim 1 wherein said compound conforming to the formula:
    $$TO_a X_b$$
    is chosen from the group consisting of titanium tetrachloride, zirconium tetrachloride and titanium trichloride.

18. The catalyst of claim 1 wherein said compound conforming to the formula:
    $$TO_a X_b$$
    is titanium tetrachloride.

19. The catalyst of claim 1 wherein said compound conforming to the formula:
    $$TO_a X_b$$
    is a compound of a metal of group Va.

20. The catalyst of claim 1 wherein said compound conforming to the formula:
    $$TO_a X_b$$
    is a compound of vanadium.

21. The catalyst of claim 1 wherein said compound conforming to the formula:
    $$TO_a X_b$$
    is a compound of a metal of Group VIa.

22. The catalyst of claim 1 wherein said solid is a metal oxide.

23. The catalyst of claim 1 wherein said solid is chosen from the group consisting of silica, alumina and titania.

24. The catalyst of claim 1 wherein said solid is pyrogenic silica.

25. A process for polymerizing a substance chosen from the group consisting of a mono-olefin, mixtures of mono-olefins, a di-olefin, mixtures of di-olefins, and mixtures thereof which comprises contacting said substance at temperatures between 25° C. and 250° C., with a catalyst comprising
    (a) a finely-divided inorganic solid having an average particle diameter of less than about 0.1 micron and having chemically linked directly to oxygen atoms in the surface thereof at least about $1 \times 10^{-4}$ equivalents per gram of structures conforming to the formula:

$$MM'_v X_n R_y$$

wherein M is chosen from the group consisting of the metals of groups IIb and IIIb; M' is a metal of Group I; $v$ is a number from 0 to 1; each X is any halogen; $n$ is a number from 0 to 2; each R is any hydrocarbon radical or hydrogen; and $y$ is a number from 1 to 3, and
    (b) a compound conforming to the general formula:

$$TO_a X_b$$

wherein T is chosen from the group consising of the metals of Groups IVa, Va, VIa, VIIa and period 4 of Group VIII; O is oxygen; $a$ is a number from 0 to 2; each X is any halogen; and $b$ is a number from 1 to 7.

26. The process of claim 25 wherein the substance polymerized is ethylene.

27. The process of claim 25 wherin the substance polymerized is propylene.

28. The process of claim 25 wherein the substance polymerized is butene-1.

29. The process of claim 25 wherein the substance polymerized is a di-olefin.

30. The process of claim 25 wherein in the formula:

$$MM'_vX_nR_y$$

M is aluminum; $v$ is 0; $n$ is 0; and each R is an alkyl group, and said compound conforming to the formula:

$$TO_aX_b$$

is a compound of Group IVa.

31. The process of claim 25 wherein in the formula:

$$MM'_vX_nR_y$$

M is aluminum; $v$ is 0; and $n$ is 0; and each R is an alkyl group, and said compound conforming to the formula:

$$TO_aX_b$$

is titanium tetrachloride.

32. The process of claim 25 wherein said solid is silica.

No references cited.

JOSEPH L. SCHOFER, *Primary Examiner.*

UNITED STATES PATENT OFFICE
CERTIFICATE OF CORRECTION

Patent No. 3,202,645                                                August 24, 1965

Joel A. Yancey

It is hereby certified that error appears in the above numbered patent requiring correction and that the said Letters Patent should read as corrected below.

Column 1, line 50, for "purpose" read -- purposes --; line 55, for "cricidolite" read -- crocidolite --; column 2, line 67, for "KalF" read -- KA1F --; column 4, line 46, for "Groups" read -- Group --; line 47, for "soid" read -- solid --; column 8, line 29, for "prdoucts" read -- products --; lines 60 and 61, for "proylene" read -- propylene --; column 12, line 35, for "anaylized" read -- analyzed --; column 13, line 27, strike out "of", second occurrence; line 28, for "form" read -- from --; same column 13, line 29, for "0" read -- 1 --; column 14, line 65, for "consising" read -- consisting --; line 72, for "wherin" read -- wherein --.

(SEAL)             Signed and sealed this 7th day of February 1967.

Attest:

ERNEST W. SWIDER                                      EDWARD J. BRENNER
Attesting Officer                                                 Commissioner of Patents